(12) United States Patent
Vaddi et al.

(10) Patent No.: US 10,047,722 B2
(45) Date of Patent: Aug. 14, 2018

(54) SYSTEM AND METHOD FOR CONTROLLING A WIND TURBINE

(71) Applicant: General Electric Company, Schenectady, NY (US)

(72) Inventors: Prashanth Kumar Reddy Vaddi, Bangalore (IN); Venkata Krishna Vadlamudi, Bangalore (IN); Pranav Agarwal, Niskayuna, NY (US); Ameet Shridhar Deshpande, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 89 days.

(21) Appl. No.: 15/221,663

(22) Filed: Jul. 28, 2016

(65) Prior Publication Data

US 2018/0030955 A1 Feb. 1, 2018

(51) Int. Cl.
*G05D 17/00* (2006.01)
*F03D 7/04* (2006.01)
(Continued)

(52) U.S. Cl.
CPC ............ *F03D 7/045* (2013.01); *F03D 7/028* (2013.01); *F03D 7/0224* (2013.01); *F03D 9/002* (2013.01); *F03D 17/00* (2016.05); *G05B 15/02* (2013.01); *F05B 2220/30* (2013.01); *F05B 2270/20* (2013.01); *F05B 2270/327* (2013.01); *F05B 2270/328* (2013.01); *F05B 2270/329* (2013.01);
(Continued)

(58) Field of Classification Search
CPC ...... Y02E 10/723; Y02E 10/721; F03D 7/024

USPC ........................................................ 700/287
See application file for complete search history.

(56) References Cited

U.S. PATENT DOCUMENTS

| 6,320,272 B1 | 11/2001 | Lading et al. |
| 2012/0183399 A1* | 7/2012 | Perkinson ............. F03D 7/0224 416/1 |

(Continued)

FOREIGN PATENT DOCUMENTS

| DE | 10 2013 004 446 A1 | 9/2014 |
| EP | 2 860 394 A2 | 4/2015 |
| WO | 2014/139614 A1 | 9/2014 |

OTHER PUBLICATIONS

Extended European Search Report and Opinion issued in connection with corresponding EP Application No. 17180753.0 dated Jan. 12, 2018.

*Primary Examiner* — Michael J Brown
(74) *Attorney, Agent, or Firm* — Dority & Manning, P.A.

(57) ABSTRACT

The present disclosure is directed to a method for controlling a wind turbine having a rotor with a plurality of rotor blades mounted thereto based on a spatial wind speed distribution. The method includes monitoring, via at least one sensor, one or more operating conditions of the wind turbine. The method also includes determining a rotor azimuth angle of the wind turbine. In addition, the method includes determining, via a physics-based model, at least one individual wind speed for one or more of the rotor blades of the wind turbine based on the one or more operating conditions and the rotor azimuth angle. The method also includes determining a spatial wind speed distribution of the wind turbine based on the at least one individual wind speed. Thus, the method further includes controlling the wind turbine based on the spatial wind speed distribution.

17 Claims, 7 Drawing Sheets

(51) Int. Cl.
*F03D 7/02* (2006.01)
*F03D 17/00* (2016.01)
*F03D 9/00* (2016.01)
*G05B 15/02* (2006.01)

(52) U.S. Cl.
CPC ... *F05B 2270/331* (2013.01); *F05B 2270/335* (2013.01); *G05B 2219/2619* (2013.01)

(56) References Cited

U.S. PATENT DOCUMENTS

| | | | |
|---|---|---|---|
| 2013/0129508 A1* | 5/2013 | Spruce | F03D 7/0224 416/1 |
| 2013/0302161 A1 | 11/2013 | Koerber et al. | |
| 2014/0140844 A1* | 5/2014 | Slot | F03D 7/04 416/1 |
| 2016/0053745 A1 | 2/2016 | Blom et al. | |

* cited by examiner

SYSTEM AND METHOD FOR CONTROLLING A WIND TURBINE

FIELD OF THE INVENTION

The present disclosures relates generally to wind turbines and, more particularly, to a system and method for controlling a wind turbine based on a spatial wind field/wind speed distribution to reduce the impact of extreme wind conditions acting on the wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle mounted on the tower, and a rotor coupled to the nacelle. The rotor typically includes a rotatable hub and a plurality of rotor blades coupled to and extending outwardly from the hub. The rotor blades capture kinetic energy of wind using known airfoil principles. More specifically, the rotor blades transmit the kinetic energy in the form of rotational energy so as to turn a shaft coupling the rotor blades to the gearbox, or if the gearbox is not used, directly to the generator. The generator then converts the mechanical energy to electrical energy that may be deployed to a utility grid.

During normal operation, wind turbines can be exposed to extreme wind gusts, turbulent wind pockets, and extreme wind shear. Such extreme wind conditions can impact the life of the mechanical components of the wind turbine, as well as the optimum power performance. Current control technologies estimate the effective wind speed (i.e. the average wind speed across the rotor) of the wind turbine based on power, pitch angle, and generator speed of the turbine. The effective wind speed is then used to determine the loads acting on the wind turbine. As such, current control methods do not account for the blade dynamics, which may lead to a lag in the estimation corresponding to a rotor azimuth angle offset of as much as 30 to 40 degrees.

In view of the aforementioned, the present disclosure provides a system and method for controlling a wind turbine based on a three-dimensional spatial wind field that takes into account blade dynamics so as to reduce the impact of extreme wind conditions acting on the wind turbine.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a method for controlling a wind turbine having a rotor with a plurality of rotor blades mounted thereto. The method includes determining, via a physics-based model, at least one individual wind speed for one or more of the rotor blades of the wind turbine based, at least in part, on one or more operating conditions and a rotor azimuth angle. The method also includes determining a spatial wind speed distribution of the wind turbine based, at least in part, on the at least one individual wind speed for the one or more rotor blades of the wind turbine. Thus, the method further includes controlling the wind turbine based on the spatial wind speed distribution.

In one embodiment, the method may also include determining of a rotor imbalance moment, a power torque, and/or a shaft torque of the wind turbine and determining, via the physics-based model, the at least one individual wind speed for the one or more rotor blades of the wind turbine based, at least in part, on at least one of the rotor imbalance moment, the power torque, or the shaft torque of the wind turbine. More specifically, in certain embodiments, the rotor imbalance moment may include a nodding rotor imbalance moment or a tilting rotor imbalance moment.

In another embodiment, the operating condition(s) of the wind turbine may include at least one of a power output, a pitch angle, a generator speed, or any other operating condition of the wind turbine.

In additional embodiments, the method may further includes determining at least one of a blade edge-wise moment or a blade flap-wise moment for each of the rotor blades of the wind turbine, determining at least one of aerodynamic coefficients or partial derivatives of at least one of the blade edge-wise moment or the blade flap-wise moment, and determining the individual wind speed for each rotor blade of the wind turbine based, at least in part, on the aerodynamic coefficients or partial derivatives of at least one of the blade edge-wise moment or the blade flap-wise moment.

In further embodiments, the physics-based model may include an extended Kalman filter. In another embodiment, the step of determining the at least one individual wind speed for the one or more rotor blades of the wind turbine may include utilizing a plurality of sensors installed on at least one of a rotating frame of the wind turbine or a fixed frame of the wind turbine.

In yet a further embodiment, the step of determining the spatial wind speed distribution of the wind turbine based on the individual wind speeds for each of the rotor blades of the wind turbine may include mapping a plurality of individual wind speeds for each of the rotor blades of the wind turbine on a rotor plane to create the spatial wind speed distribution.

In certain embodiments, the method may further include estimating one or more loading conditions of the wind turbine based on the individual wind speeds for each of the rotor blades of the wind turbine and controlling the wind turbine based, at least in part, on the one or more loading conditions of the wind turbine. More specifically, in such embodiments, the loading condition(s) of the wind turbine may include a vertical wind shear, a horizontal wind shear, an exponential shear profile, a yaw direction, a tower deflection, temporal turbulence, a partial wake detection, or any other loading condition.

In still another embodiment, the step of determining the at least one individual wind speed for one or more of the rotor blades of the wind turbine further comprises estimating a plurality of individual wind speeds for each of the rotor blades of the wind turbine based on a plurality of distributed strain gauge measurements.

In another aspect, the present disclosure is directed to a method for estimating a spatial wind speed distribution of a wind turbine having a rotor with a plurality of rotor blades mounted thereto. The method includes monitoring, via at least one sensor, one or more operating conditions of the wind turbine. The method also includes determining at least one or a rotor imbalance moment of the wind turbine or a rotor azimuth angle of the rotor of the wind turbine. Further, the method includes determining, via a physics-based model, at least one individual wind speed for one or more of the rotor blades of the wind turbine based on the one or more operating conditions and at least one of the rotor imbalance moment or the rotor azimuth angle. In addition, the method includes determining the spatial wind speed distribution of the wind turbine based on the individual wind speeds for each of the rotor blades of the wind turbine.

In yet another aspect, the present disclosure is directed to a system for controlling a wind turbine having a rotor with a plurality of rotor blades mounted thereto. The system includes one or more sensors configured to measure one or more operating conditions of the wind turbine and a controller communicatively coupled with the one or more sensors. The controller is configured to perform one or more operations, including but not limited to determining, via a physics-based model programmed in the controller, at least one individual wind speed for one or more of the rotor blades of the wind turbine based on the one or more operating conditions and at least one of a rotor imbalance moment or a rotor azimuth angle, determining a spatial wind speed distribution of the wind turbine based, at least in part, on the at least one individual wind speed for the one or more rotor blades of the wind turbine, and controlling the wind turbine based, at least in part, on the spatial wind speed distribution.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for estimating a three-dimensional spatial wind field (i.e. a spatial wind speed distribution) for a wind turbine that can be used for wind turbine control. The method includes monitoring one or more operating conditions of the wind turbine via a plurality of sensors, such as pitch angle, generator speed, and power output. The method also includes determining at least one rotor imbalance moment of the wind turbine and/or a rotor azimuth angle of the rotor of the wind turbine. Thus, using a physics-based model, the method further includes determining at least one individual wind speed for one or more of the rotor blades of the wind turbine based on the operating condition(s), the rotor imbalance moment, and/or the rotor azimuth angle. The spatial wind field can then be created from the individual wind speeds for each of the rotor blades. As such, the wind turbine can be controlled based on the spatial wind speed distribution.

Thus, the spatial wind field/wind speed distribution of the present disclosure takes into account the filtered rotor imbalance moments and the rotor azimuth angle to obtain the effective individual wind speed of the rotor blades. Further, certain embodiments of the present disclosure may also consider aerodynamic coefficients and/or partial derivatives of the blade flap-wise or edge-wise moments. As such, the system of the present disclosure is configured to use an internal model of the wind turbine based on coupled structural dynamics of the rotor blades as well as aerodynamics. Such a model is capable of inferring underlying hidden blade states as well as the wind disturbance affecting each rotor blade of the turbine. Further, the internal model of the turbine combined with an extended Kalman filter provides a low latency blade effective wind estimation on the rotor blades.

Accordingly, the present disclosure provides many advantages not included in the prior art. For example, the system and method of the present disclosure provides spatial wind field information to the turbine controller using existing sensors. Further, the spatial wind field information can be used to optimize rotor imbalance control, perform better speed tracking, and/or optimize fatigue and extreme loads acting on the wind turbine. In addition, the system and method of the present disclosure provides a smaller lag compared to wind estimates based on loads that do not consider the rotor azimuth angle offset. Moreover, the present disclosure solves the partial wake problem by estimating temporal turbulence (on top of periodic wind-field) which can further guide the horizontal wake estimation (when left rotor is more turbulent than right, etc.). Further, the high bandwidth wind estimator of the present disclosure includes a model that combines blade structural modes and aerodynamics of the wind turbine that provides high azimuth accuracy. Moreover, the present disclosure is configured to provide an estimation of exponential shear and tower shadow effect, which can serve as a proxy for tip displacement and provide additional safeguard against one of the blades hitting the tower. In addition, the generated wind field can be used in a wind resource assessment of each pad in a wind farm and can also be used as a model input for a digital twin and life cycle accounting of the wind turbine. The present disclosure can also be implemented using existing sensors; therefore, the system only requires a software update in order to be deployed.

Figure 1:
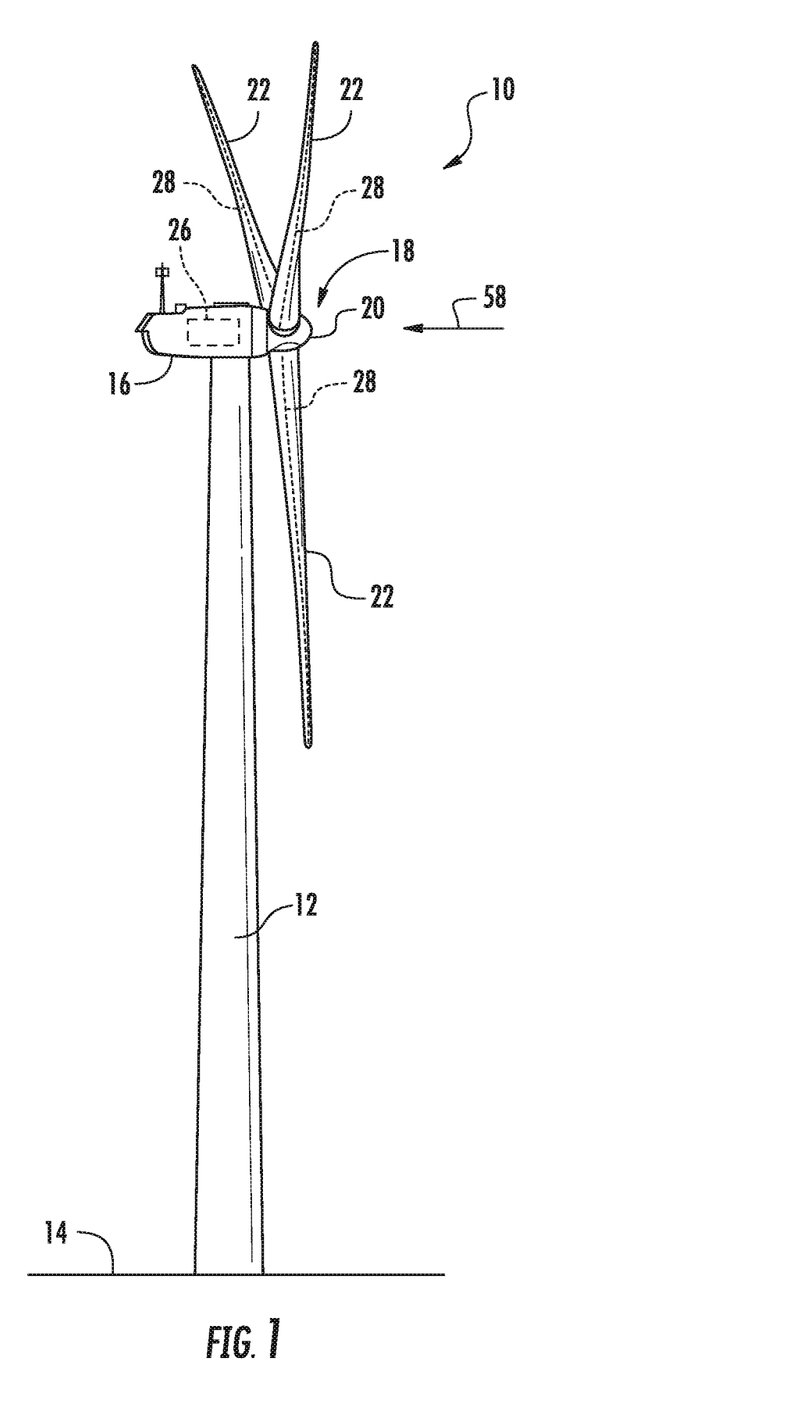
FIG. 1 illustrates a perspective view of one embodiment of a wind turbine according to the present disclosure.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
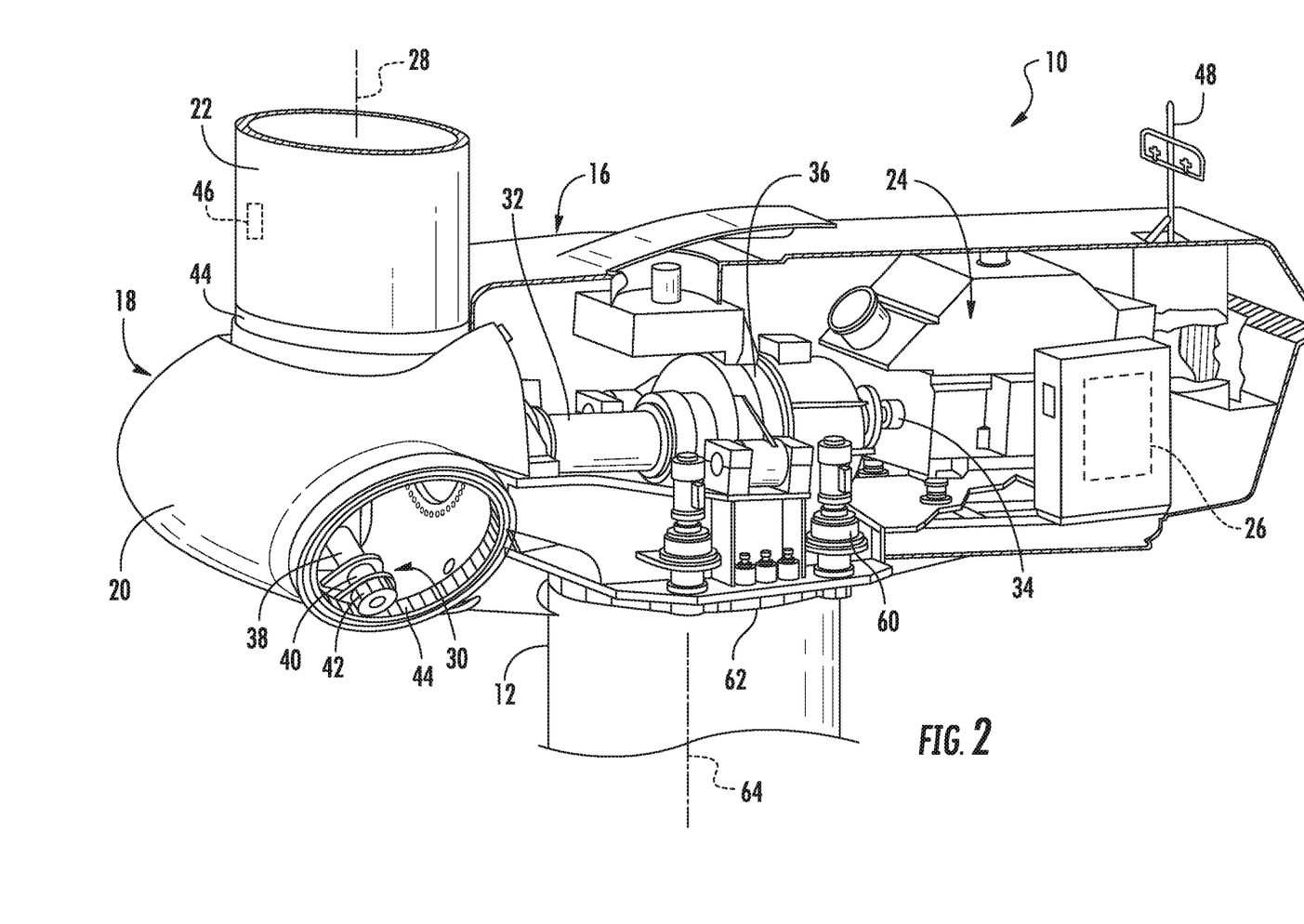
FIG. 2 illustrates a simplified, internal view of one embodiment of a nacelle of a wind turbine according to the present disclosure.

The wind turbine 10 may also include a turbine control system or turbine controller 26 centralized within the nacelle 16. In general, the turbine controller 26 may include a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals to one or more pitch control systems or pitch adjustment mechanisms 30 (FIG. 2) of the wind turbine 10. During operation of the wind turbine 10, the controller 26 may generally control each pitch adjust mechanism 30 in order to alter the pitch angle of each rotor blade 22 between 0 degrees (i.e., a power position of the rotor blade 22) and 90 degrees (i.e., a feathered position of the rotor blade 22). In addition, the turbine controller 26 may control the orientation of the nacelle 16 with respect to the wind direction 58 by transmitting suitable control signals to one or more yaw drive mechanisms 60 that engage a yaw bearing 62 (FIG. 2). Thus, rotation of the yaw bearing 62 about a yaw axis 64 changes the orientation of the nacelle 16.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 32 coupled to the hub 20 for rotation therewith. The rotor shaft 32 may, in turn, be rotatably coupled to a generator shaft 34 of the generator 24 through a gearbox 36. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 30 of the wind turbine 10 (one of which is shown) to facilitate rotation of each rotor blade 22 about its pitch axis 28.

In general, each pitch adjustment mechanism 30 may include any suitable components and may have any suitable configuration that allows the pitch adjustment mechanism 30 to function as described herein. For example, in several embodiments, each pitch adjustment mechanism 30 may include a pitch drive motor 38 (e.g., any suitable electric motor), a pitch drive gearbox 40, and a pitch drive pinion 42. In such embodiments, the pitch drive motor 38 may be coupled to the pitch drive gearbox 40 so that the pitch drive motor 38 imparts mechanical force to the pitch drive gearbox 40. Similarly, the pitch drive gearbox 40 may be coupled to the pitch drive pinion 42 for rotation therewith. The pitch drive pinion 42 may, in turn, be in rotational engagement with a pitch bearing 44 coupled between the hub 20 and a corresponding rotor blade 22 such that rotation of the pitch drive pinion 42 causes rotation of the pitch bearing 44. Thus, in such embodiments, rotation of the pitch drive motor 38 drives the pitch drive gearbox 40 and the pitch drive pinion 42, thereby rotating the pitch bearing 44 and the rotor blade 22 about the pitch axis 28.

In alternative embodiments, it should be appreciated that each pitch adjustment mechanism 30 may have any other suitable configuration that facilitates rotation of a rotor blade 22 about its pitch axis 28. For instance, pitch adjustment mechanisms 30 are known that include a hydraulic or pneumatic driven device (e.g., a hydraulic or pneumatic cylinder) configured to transmit rotational energy to the pitch bearing 44, thereby causing the rotor blade 22 to rotate about its pitch axis 28. Thus, in several embodiments, instead of the electric pitch drive motor 38 described above; each pitch adjustment mechanism 30 may include a hydraulic or pneumatic driven device that utilizes fluid pressure to apply torque to the pitch bearing 44.

Referring still to FIG. 2, the wind turbine 10 may also include a plurality of sensors (e.g. such as sensors 46, 48) for monitoring one or more operating parameters, wind conditions, and/or loading conditions of the wind turbine 10. As used herein, a parameter or condition of the wind turbine 10 is "monitored" when a sensor is used to determine its present value. Thus, the term "monitor" and variations thereof are used to indicate that the sensors 46, 48 need not provide a direct measurement of the parameter and/or condition being monitored. For example, the sensors 46, 48 may be used to generate signals relating to the parameter and/or condition being monitored, which can then be utilized by the turbine controller 26 or other suitable device to determine the actual parameter and/or condition. More specifically, in certain embodiments, the sensor(s) 46, 48 may be configured for monitoring the pitch angle of each rotor blade 22, any bending moments on the rotor blades 22, accelerations of the nacelle 16, the speed of the rotor 18 and/or the rotor shaft 32, the speed of the generator 24 and/or the generator shaft 34, the torque on the rotor shaft 32 and/or the generator shaft 34, the wind speed and/or wind direction, and/or any other suitable parameters and/or conditions.

Figure 3:
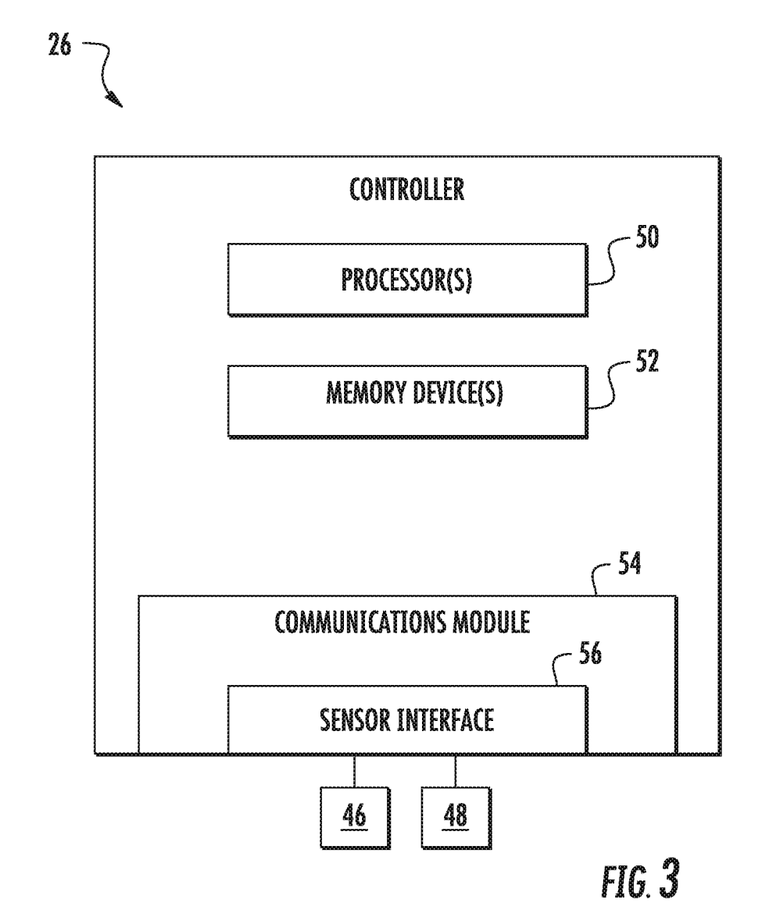
FIG. 3 illustrates a schematic diagram of one embodiment of suitable components that may be included within a turbine controller of a wind turbine according to the present disclosure.

Referring now to FIG. 3, there is illustrated a block diagram of one embodiment of suitable components that may be included within the turbine controller 26 in accordance with aspects of the present disclosure. As shown, the turbine controller 26 may include one or more processor(s) 50 and associated memory device(s) 52 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 52 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 52 may generally be configured to store suitable computer-readable instructions that, when implemented by the processor(s) 50, configure the turbine controller 26 to perform various functions including, but not limited to, transmitting suitable control signals to one or more of the pitch adjustment mechanisms 30, monitoring various parameters and/or conditions of the wind turbine 10 and various other suitable computer-implemented functions.

Additionally, the turbine controller 26 may also include a communications module 54 to facilitate communications between the controller 26 and the various components of the wind turbine 10. For instance, the communications module 54 may serve as an interface to permit the turbine controller 26 to transmit control signals to each pitch adjustment mechanism 30 for controlling the pitch angle of the rotor blades 22. Moreover, the communications module 54 may include a sensor interface 56 (e.g., one or more analog-to-digital converters) to permit signals transmitted from the sensors 46 of the wind turbine 10 to be converted into signals that can be understood and processed by the processors 50.

It should be appreciated that the sensor(s) 46 may be communicatively coupled to the communications module 54 using any suitable means. For example, as shown in FIG. 3, the sensors 46, 48 may be coupled to the sensor interface 56 via a wired connection. However, in other embodiments, the sensors 46, 48 may be coupled to the sensor interface 56 via a wireless connection, such as by using any suitable wireless communications protocol known in the art.

Figure 4:
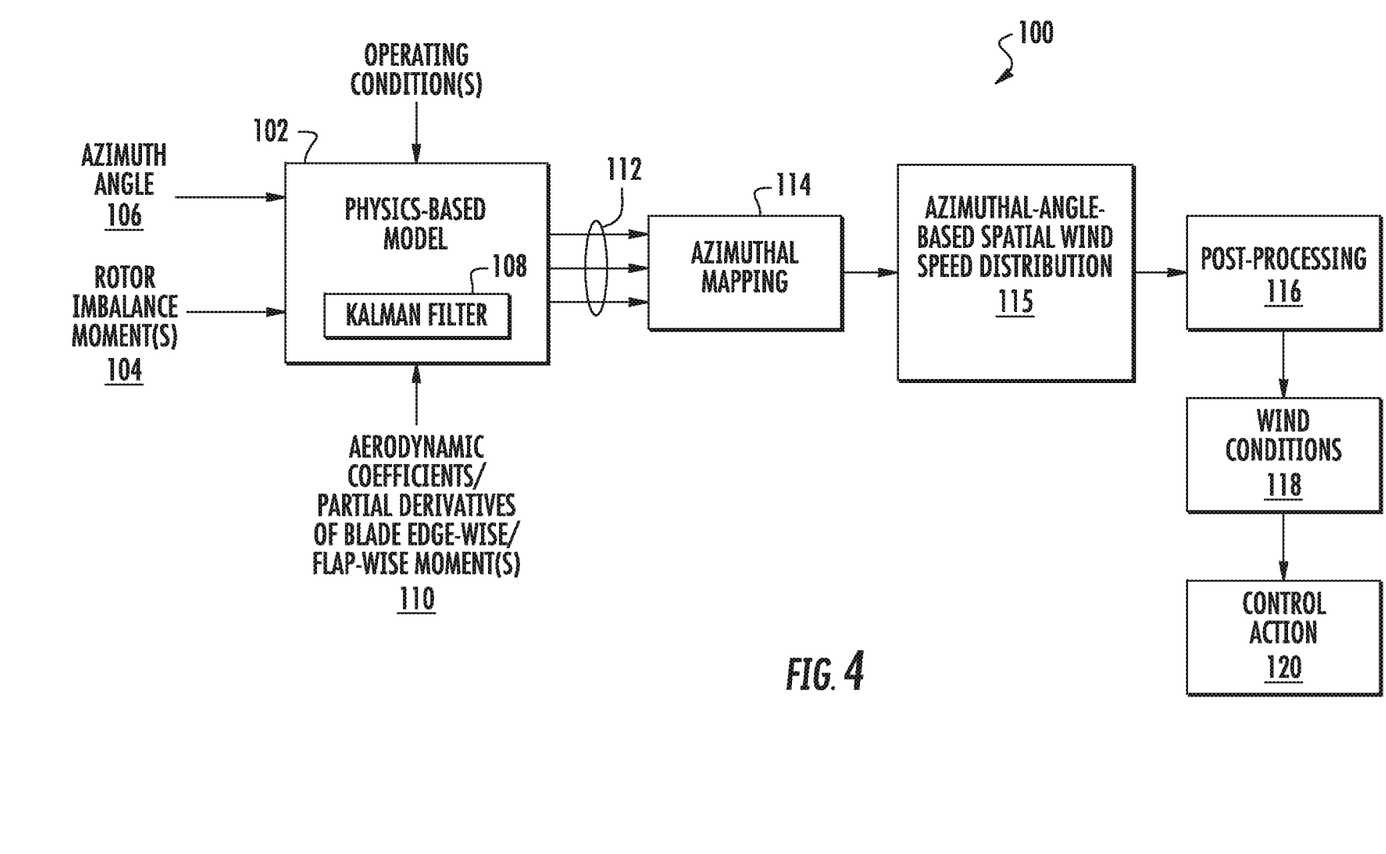
FIG. 4 illustrates a schematic diagram of one embodiment of a system for estimating a spatial wind field for a wind turbine for use in wind turbine control according to the present disclosure.

Referring now to FIG. 4, a system 100 for controlling a wind turbine, e.g. the wind turbine 10 of FIG. 1, based on a three-dimensional spatial wind field is illustrated. Further, as shown, the system 100 may include a controller, such as the turbine controller 26 that is preprogrammed with a physics-based model 102. More specifically, as shown, the physics-based model 102 is configured to receive a plurality of inputs that can be used to determine the individual wind speeds of each of the rotor blades 22 of the wind turbine 10 as described herein. As used herein, a physics-based model generally refers to a computer-generated model used to generate and visualize constrained shapes, motions of rigid and non-rigid objects, as well as object interactions with the environment for the purposes of animation. As such, the physics-based model 102 of the present disclosure is configured to generate a spatial wind field or wind speed distribution of the wind turbine 10 that can be used for wind turbine control.

More specifically, as shown, one of the inputs of the physics-based model 102 may include one or more operating conditions of the wind turbine 10. In certain embodiments, the operating condition(s) may include at least one of a power output, a pitch angle, a generator speed, or any other operating condition of the wind turbine 10. Further, the sensor(s) 46, 48 described herein may be configured to measure the operating condition(s) and may include any suitable sensors, including but not limited accelerometers, strain gauges, proximity probes, or similar. Further, the sensor(s) 46, 48 may be located at any suitable location along each of the rotor blades 22 and/or distributed across the rotor 18.

In addition, another input 104 of the physics-based model 102 may include a rotor imbalance moment, a power torque, and/or a shaft torque of the wind turbine 10. More specifically, in certain embodiments, the rotor imbalance moment(s) 104 may include a filtered rotor imbalance moment such as a nodding rotor imbalance moment (e.g. a shaft D moment), a titling rotor imbalance moment (a shaft Q moment), and/or any combinations thereof.

Figure 5:
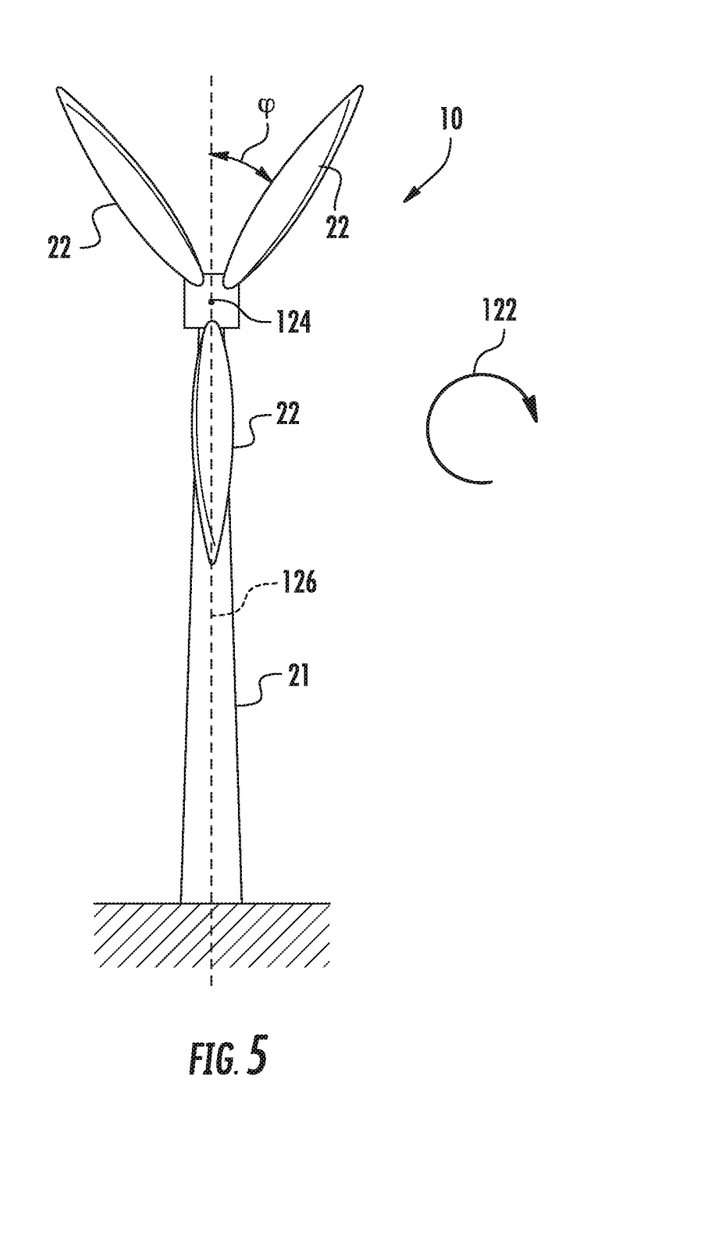
FIG. 5 illustrates a front view of one embodiment of a wind turbine according to the present disclosure, particularly illustrating a rotor azimuth angle.

Still another input 106 of the physics-based model 102 may include the azimuth angle of the rotor 18. It should be understood that the "azimuth angle" as described herein generally encompasses the position of one of the rotor blades 22 in the circumferential direction 122 of the wind turbine rotation axis 124, with the rotor azimuth angle φ defined to be 0° in the case where the rotor blade 22 is located in the vertical upward direction (defined by vertical axis 126) or in the direction closest thereto (FIG. 5). Referring back to FIG. 4, a further input 110 of the physics-based model 102 may include also include aerodynamic coefficients and/or the partial derivatives of the blade edge-wise moment and/or the blade flap-wise moment.

Figure 6:
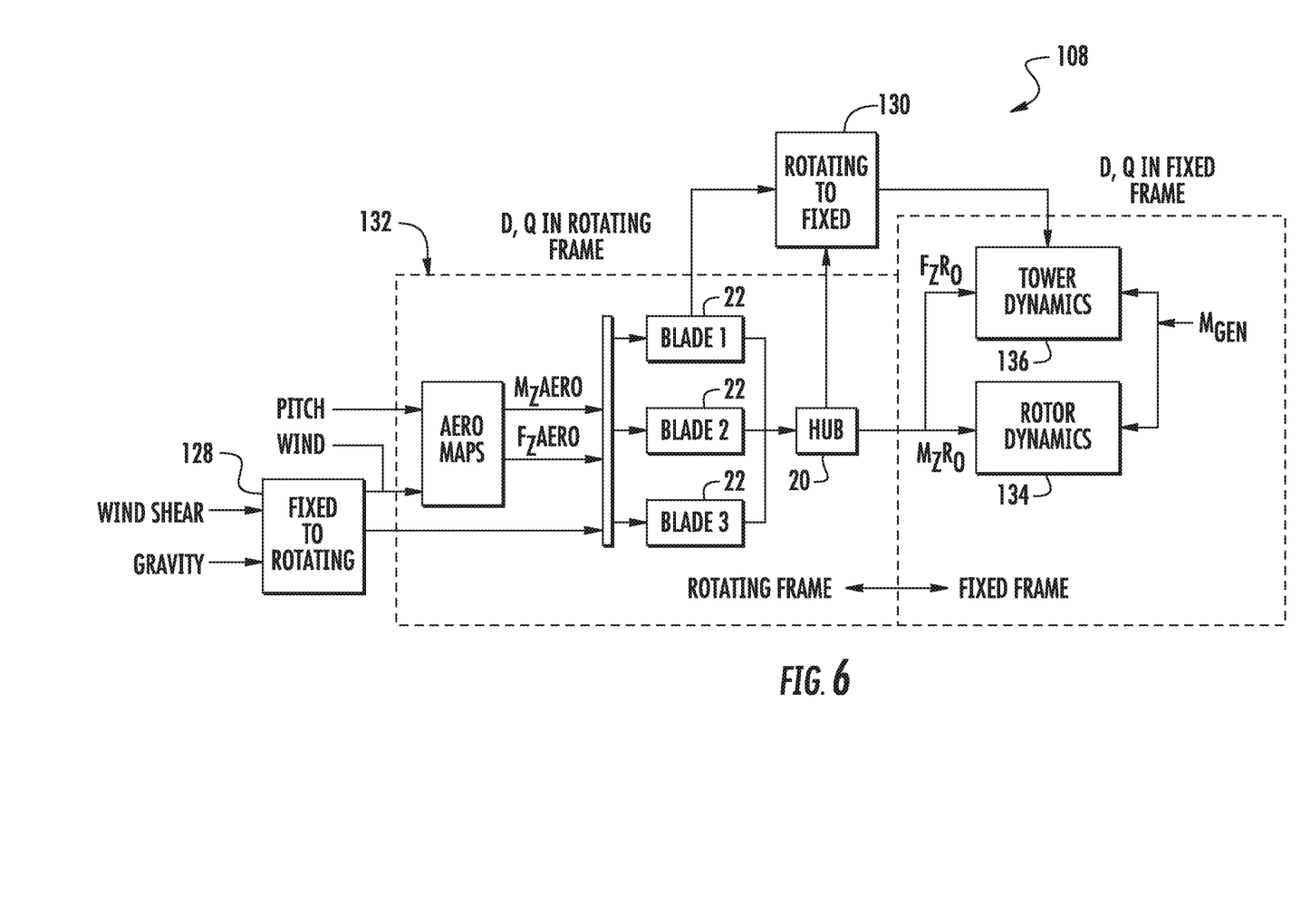
FIG. 6 illustrates a detailed, schematic diagram of one embodiment of certain features of a Kalman filter of the system of FIG. 4 according to the present disclosure.

As such, the physics-based model 102 of the system 100 is configured to determine an individual wind speed for each of the rotor blades 22 of the wind turbine 10 based on the inputs. More specifically, as shown in FIGS. 4 and 6, the physics-based model 102 may include an extended Kalman filter 108. As used herein a Kalman filter (also known as a linear quadratic estimator), generally refers to an algorithm that uses a series of measurements observed over time, that typically contain statistical noise and/or other inaccuracies, and produces estimates of unknown variables that tend to be more precise than those based on a single measurement alone. More specifically, in certain embodiments, Kalman filters use Bayesian inferences and estimate a joint probability distribution over the variables for each timeframe. As such, in certain embodiments, the Kalman filter 108 may be configured to determine the individual wind speed for each of the rotor blades 22 of the wind turbine 10 based on one or more of the inputs, for example, based on Equations (1)-(5) below:

$$M_{f1} \cos(\varphi) + M_{f2} \cos(\varphi+120) + M_{f3} \cos(\varphi+240) = M_y \quad \text{Equation (1)}$$

$$M_{f1} \sin(\varphi) + M_{f2} \sin(\varphi+120) + M_{f3} \sin(\varphi+240) = M_x \quad \text{Equation (2)}$$

$$M_{fi} = F(V_i, \theta_i, \lambda_i) \quad \text{Equation (3)}$$

$$M_f W_r = PE \quad \text{Equation (4)}$$

$$M_r = G(V_i, \theta_a, \lambda_a) \quad \text{Equation (5)}$$

Where $M_{f1}$ is the blade root flap moment for a first rotor blade, $M_{f2}$ is the blade root flap moment for a second rotor blade, $M_{f3}$ is the blade root flap moment for a first rotor blade, $\varphi$ is the rotor azimuth angle, $M_y$ is the $M_x$ is the $M_{fi}$ is the blade root flap moment of one of the rotor blades 22, $V_i$ is the individual wind speed of one of the rotor blades 22, $\theta_i$ is the individual pitch angle of each of the rotor blades 22, $\lambda_i$ is the individual tip speed ratio of each of the rotor blades 22, $M_r$ is the rotor imbalance moment of the rotor 18, $W_r$ is the rotor speed of the wind turbine 10, PE is the power electrical, $\theta_a$ is the average pitch angle of the rotor blades 22, $\lambda_a$ is the average tip speed ratio of one of the rotor blades 22, Further, FIG. 6 illustrates a schematic view of one embodiment of specific features of the Kalman filter 108 connected together. More specifically, for the illustrated embodiment, the wind turbine 10 includes three rotor blades 22, namely Blade 1, Blade 2, and Blade 3. Moreover, at 128 and 130, the model for Kalman filter 108 is configured to decouple the influences of rotating (i.e. azimuth-angle-dependent) and non-rotating dynamics of the rotor blades 22 on the remaining turbine structure to create a linear model. As such, in certain embodiments, the step of determining the individual wind speed for each rotor blade 22 of the wind turbine 10 may include utilizing a plurality of sensors installed on either a rotating frame of the wind turbine 10 or a fixed frame of the wind turbine 10. Thus, the core dynamics 132, which refers to the non-rotating dynamics, can be separated or carved out from the secondary, fast time-varying azimuthal non-linear rotating dynamics (i.e. those components outside of dotted box 132). Accordingly, the system 100 includes a unified high-bandwidth model of the rotor blade(s) 22 and hub 20, the rotor 18 and/or drive-train dynamics 134, and the tower dynamics 136.

Referring back to FIG. 4, once the extended Kalman filter 108 determines the blade-specific wind speeds 112 for each of the rotor blades 22, the system 100 is configured to map 114 the time-varying blade-specific wind speeds/velocities for each of the rotor blades 22 on a rotor plane to determine or create a three-dimensional spatial wind speed distribution 115 for the wind turbine 10. In additional embodiments, the system 100 may also include post-processing 116 of the spatial wind speed distribution 115 so as to determine one or more loading conditions 118 of the wind turbine 10, including but not limited to vertical wind shear, a horizontal wind shear, an exponential shear profile, a yaw direction, a tower deflection, temporal turbulence, a partial wake detection, or any other loading condition. For example, in certain embodiments, by using the time-varying information of the spatial wind field 115, the turbulence in various locations of the rotor plane can be determined and the distribution of the turbulence can be used to understand partial wake (i.e. the portion of the wind turbine 10 under the influence of the wake of a neighboring turbine).

In additional embodiments, such loading conditions can then be used to implement a control action 120 to the wind turbine 10. As such, the system 100 of the present disclosure is configured to estimate individual blade wind speeds and provide spatial wind field information to the controller 26 such that the wind turbine 10 can operate with minimal impact due to extreme wind conditions. For example, the spatial wind speed distribution 115 with the azimuth angle $\varphi$ can be used for improved rotor imbalance control and optimum fatigue loads.

Figure 7:
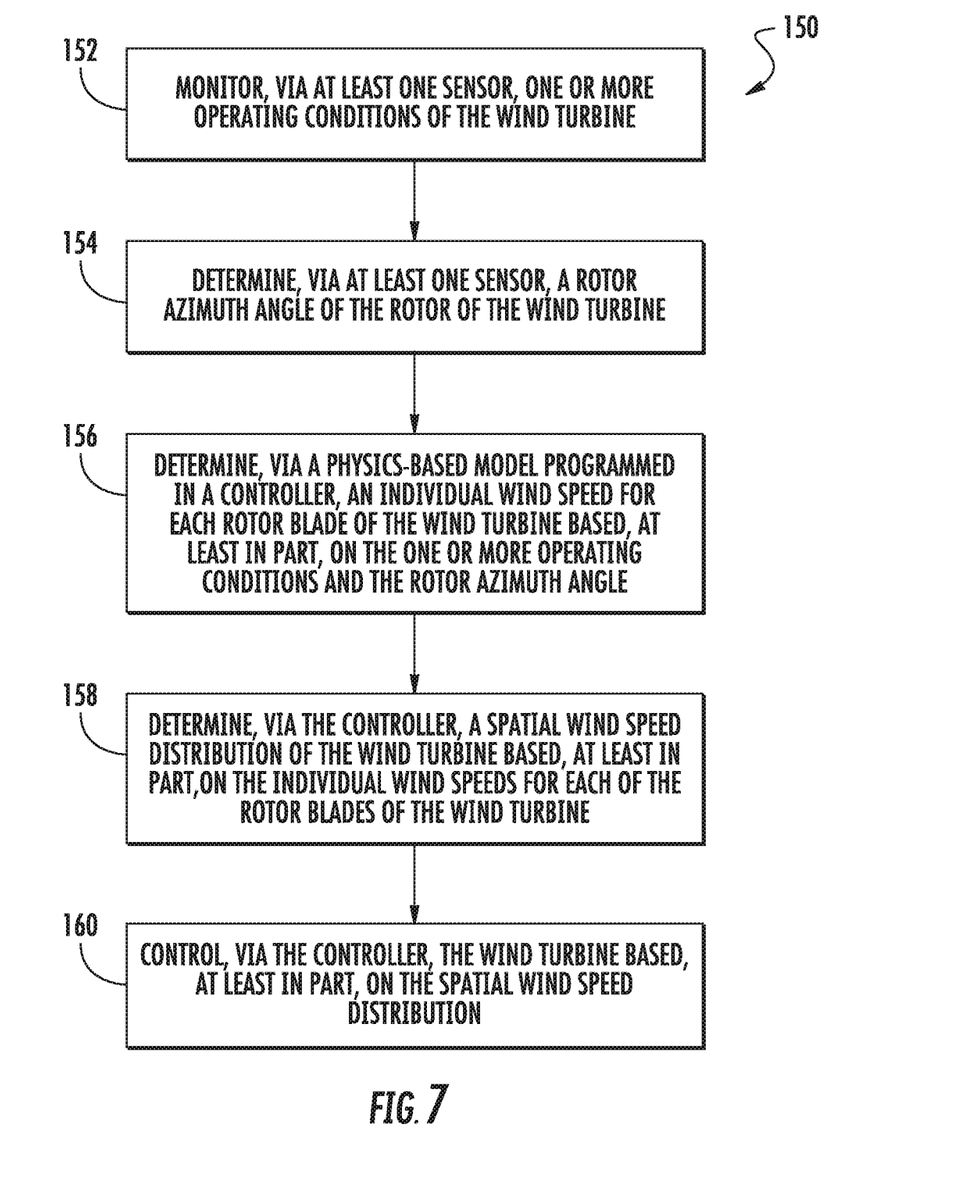
FIG. 7 illustrates a flow diagram of one embodiment of a method for controlling a wind turbine based on a spatial wind field according to the present disclosure.

Referring now to FIG. 7, a method 150 for controlling a wind turbine, e.g. the wind turbine 10 of FIG. 1 is illustrated. In several embodiments, it should be appreciated that the disclosed method 150 may be performed automatically by the turbine controller 26. For example, the turbine controller 26 may be provided with suitable computer-readable instructions that, when implemented, configure the controller 26 to transmit control signals that implement the method 150. More specifically, as shown at 152, the method 150 may include monitoring, via one or more sensors (e.g. sensors 46, 48), one or more operating conditions of the wind turbine 10. As mentioned, in certain embodiments, the operating condition(s) may include at least one of a power output, a pitch angle, a generator speed, or any other operating condition of the wind turbine 10. As shown at 154, the method 150 also includes determining, via one or more sensors, a rotor azimuth angle 104 (e.g. $\varphi$). In addition, the method 150 may further include determining a blade edge-wise moment and/or a blade flap-wise moment for each of the rotor blades 22 of the wind turbine 10 and determining at least one of aerodynamic coefficients or partial derivatives of the blade edge-wise moment and/or the blade flap-wise moment.

Thus, as shown at 156, the method 150 also includes determining, via the physics-based model 102, an individual wind speed for each of the rotor blades 22 of the wind turbine 10 based, at least in part, on the one or more operating conditions, the rotor imbalance moment, and/or the rotor azimuth angle. Further, the method 150 may include determining the individual wind speed for each rotor blade 22 of the wind turbine 10 based, at least in part, on the aerodynamic coefficients and/or partial derivatives of the blade edge-wise moment and/or the blade flap-wise moment. In another embodiment, the step of determining the individual wind speed for each rotor blade 22 of the wind turbine 10 may include estimating the individual wind speed for each rotor blade 22 of the wind turbine 10 based on a plurality of distributed strain gauge measurements.

As shown at 158, the method 150 further includes determining a spatial wind speed distribution of the wind turbine 10 based, at least in part, on the individual wind speeds for each of the rotor blades 22 of the wind turbine 10. In another embodiment, the step of determining the spatial wind speed distribution of the wind turbine 10 based on the individual wind speeds for each of the rotor blades 22 of the wind turbine 10 may include azimuthal mapping the individual wind speeds for each of the rotor blades 22 of the wind turbine 10 on a rotor plane to create the spatial wind speed distribution.

Thus, as shown at 160, the method 150 includes controlling the wind turbine 10 based, at least in part, on the spatial wind speed distribution. More specifically, in certain embodiments, the method 150 may further include estimating one or more loading conditions of the wind turbine 10 based on the individual wind speeds for each of the rotor blades 22 of the wind turbine 10 and controlling the wind turbine 10 based, at least in part, on the one or more loading conditions of the wind turbine 10. More specifically, in such embodiments, the loading condition(s) of the wind turbine 10 may include a vertical wind shear, a horizontal wind shear, an exponential shear profile, a yaw direction, a tower deflection, temporal turbulence, a partial wake detection, or any other loading condition.

More specifically, the turbine controller 26 may be configured to implement one or more control actions depending on the time-varying blade specific wind velocities of each rotor blade 22. The control action(s) as described herein may include any suitable control action so as to reduce the negative impact of the wind conditions acting on the wind turbine 10. For example, in several embodiments, the control action may include temporarily de-rating or up-rating the wind turbine 10 to permit the loads acting on or more of the wind turbine 10 components to be reduced or otherwise controlled. Up-rating the wind turbine, such as by up-rating torque, may temporarily slow down the wind turbine 10 and act as a brake to help reduce loads. De-rating the wind turbine 10 may include speed de-rating, torque de-rating or a combination of both. Further, the wind turbine 10 may be de-rated by reducing speed and increasing torque, which can be beneficial so as to maintain power. In another embodiment, the wind turbine 10 may be de-rated by pitching one or more of the rotor blades 22 about its pitch axis 28. More specifically, the controller 26 may generally control each pitch adjustment mechanism 30 in order to alter the pitch angle of each rotor blade 22 between −10 degrees (i.e., a power position of the rotor blade 22) and 90 degrees (i.e., a feathered position of the rotor blade 22). In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine having a rotor with a plurality of rotor blades mounted thereto, the method comprising:
    determining, via a physics-based model programmed in a controller, a plurality of individual wind speeds for the plurality of rotor blades of the wind turbine based, at least in part, on one or more operating conditions and a rotor azimuth angle of the rotor;
    mapping via the controller, the plurality of individual wind speeds for the plurality of rotor blades of the wind turbine on a rotor plane to create a spatial wind speed distribution; and,
    controlling, via the controller, the wind turbine based, at least in part, on the spatial wind speed distribution.

2. The method of claim 1, further comprising determining at least one of a rotor imbalance moment, a power torque, or a shaft torque of the wind turbine and determining, via the physics-based model, the individual wind speeds for the plurality of rotor blades of the wind turbine based, at least in part, on at least one of the rotor imbalance moment, the power torque, or the shaft torque of the wind turbine.

3. The method of claim 2, wherein the at least one rotor imbalance moment comprises at least one of a nodding rotor imbalance moment or a tilting rotor imbalance moment.

4. The method of claim 1, wherein the one or more operating conditions comprise at least one of a power output, a pitch angle, or a generator speed.

5. The method of claim 1, further comprising:
    determining at least one of a blade edge-wise moment or a blade flap-wise moment for each of the rotor blades of the wind turbine,
    determining at least one of aerodynamic coefficients or partial derivatives of at least one of the blade edge-wise moment or the blade flap-wise moment, and
    determining the individual wind speeds for the plurality of rotor blades of the wind turbine based, at least in part, on the aerodynamic coefficients or partial derivatives of at least one of the blade edge-wise moment or the blade flap-wise moment.

6. The method of claim 1, wherein the physics-based model further comprises an extended Kalman filter.

7. The method of claim 1, wherein determining the individual wind speeds for the plurality of rotor blades of the wind turbine further comprises utilizing a plurality of sensors installed on at least one of a rotating frame of the wind turbine or a fixed frame of the wind turbine.

8. The method of claim 1, further comprising estimating one or more loading conditions of the wind turbine based on the plurality of individual wind speeds for the plurality of rotor blades of the wind turbine and controlling the wind turbine based, at least in part, on the one or more loading conditions of the wind turbine.

9. The method of claim 8, wherein the one or more loading conditions of the wind turbine comprise at least one of a vertical wind shear, a horizontal wind shear, an exponential shear profile, a yaw direction, a tower deflection, temporal turbulence, or a partial wake detection.

10. The method of claim 1, further comprising estimating the plurality of individual wind speeds for each of the rotor blades of the wind turbine based on a plurality of distributed strain gauge measurements.

11. A system for controlling a wind turbine having a rotor with a plurality of rotor blades mounted thereto, the system comprising:
    one or more sensors configured to measure one or more operating conditions of the wind turbine; and,
    a controller communicatively coupled with the one or more sensors, the controller configured to perform one or more operations, the one or more operations comprising:
        determining, via a physics-based model programmed in the controller, at least one individual wind speed for one or more of the rotor blades of the wind turbine based on the one or more operating conditions and at least one of a rotor imbalance moment or a rotor azimuth angle,
        mapping the plurality of individual wind speeds for the plurality of rotor blades of the wind turbine on a rotor plane to create a spatial wind speed distribution, and
        controlling the wind turbine based, at least in part, on the spatial wind speed distribution.

12. The system of claim 11, wherein the one or more operating conditions comprise at least one of a power output, a pitch angle, or a generator speed.

13. The system of claim 11, wherein the at least one rotor imbalance moment comprises at least one of a nodding rotor imbalance moment or a tilting rotor imbalance moment.

14. The system of claim 11, wherein the one or more operations further comprise:
   determining at least one of a blade edge-wise moment or a blade flap-wise moment for each of the rotor blades of the wind turbine,
   determining at least one of aerodynamic coefficients or partial derivatives of at least one of the blade edge-wise moment or the blade flap-wise moment, and
   determining the individual wind speeds for the plurality of rotor blades of the wind turbine based, at least in part, on the aerodynamic coefficients or partial derivatives of at least one of the blade edge-wise moment or the blade flap-wise moment.

15. The system of claim 11, wherein the physics-based model further comprises an extended Kalman filter.

16. The system of claim 11, wherein determining the individual wind speeds for the plurality of rotor blades of the wind turbine further comprises utilizing a plurality of sensors installed on at least one of a rotating frame of the wind turbine or a fixed frame of the wind turbine.

17. The system of claim claim 11, wherein the one or more operations further comprise:
   estimating one or more loading conditions of the wind turbine based on the plurality of individual wind speeds for the plurality of rotor blades of the wind turbine, and
   controlling the wind turbine based, at least in part, on the one or more loading conditions of the wind turbine, wherein the one or more loading conditions of the wind turbine comprise at least one of a vertical wind shear, a horizontal wind shear, an exponential shear profile, a yaw direction, a tower deflection, temporal turbulence, or a partial wake detection.

* * * * *